United States Patent [19]

Kenmotsu et al.

[11] Patent Number: 5,105,418
[45] Date of Patent: Apr. 14, 1992

[54] DISK DRIVE WITH MEANS TO PLAY EITHER SIDE OF A DISK

[75] Inventors: Isami Kenmotsu; Yoshihisa Itoh; Toshihiko Kurihara; Yositsugu Araki; Taichi Akiba; Tadashi Funabashi, all of Saitama, Japan

[73] Assignee: Pioneer Electronic Corporation, Tokyo, Japan

[21] Appl. No.: 263,465

[22] Filed: Oct. 27, 1988

[30] Foreign Application Priority Data

Oct. 27, 1987 [JP] Japan ................... 62-271016
Oct. 27, 1987 [JP] Japan ................... 62-271017
Oct. 27, 1987 [JP] Japan ................... 62-271018
Nov. 6, 1987 [JP] Japan ................ 62-170202[U]

[51] Int. Cl.⁵ .................... G11B 1/00; G11B 21/04
[52] U.S. Cl. .................... 369/195; 369/199; 369/75.2
[58] Field of Search .......... 369/195, 75.2, 199, 369/75.1, 34

[56] References Cited

U.S. PATENT DOCUMENTS

| 4,566,087 | 1/1986 | Kraft | 369/34 |
| 4,771,416 | 9/1988 | Ishikashi et al. | 369/199 |
| 4,839,881 | 6/1989 | Takahara et al. | 369/195 |
| 4,911,324 | 3/1989 | Ikedo et al. | 369/195 |
| 4,949,328 | 8/1990 | Kase et al. | 369/195 |

Primary Examiner—William M. Shoop, Jr.
Assistant Examiner—John W. Cabeca
Attorney, Agent, or Firm—Sughrue, Mion, Zinn, Macpeak & Seas

[57] ABSTRACT

A disk drive according to a first embodiment includes a pickup movable along a radial direction of the disk and a reversing mechanism for moving the pickup from one side of the disk to the other side by rotating the pickup about an axis corresponding to the radial direction of the disk. In a second embodiment, there can be only one pickup which can reverse sides of the disk or a pickup on each side of the disk. The pickup(s) are moved along guide rails on either side of the disk and the guide rails are supported by rotatable base members. A linking arm links the two base members together so that rotation of one will cause rotation of the other. In a third embodiment, a pickup and a rack are supported on a slider for moving the pickup along the surface of a disk. The rack has three toothed surfaces including first, second, and third surfaces for engaging first, second and third feed screws, respectively. In the fourth embodiment, a disk player includes either a single, reversible pickup or a pickup on each side of a disk.

19 Claims, 9 Drawing Sheets

TO PICKUP    TO BASEPLATE

FIG. 8

DIRECTION OF REVERSION

DISK DRIVE WITH MEANS TO PLAY EITHER SIDE OF A DISK

BACKGROUND OF THE INVENTION

The present invention relates to a disk drive such as an optical video disk player or a compact disk player, and a playback method adapted for a disk drive capable of playing back a compact disk, including a DC-V, or an optical video disk, or both.

Figure 1:
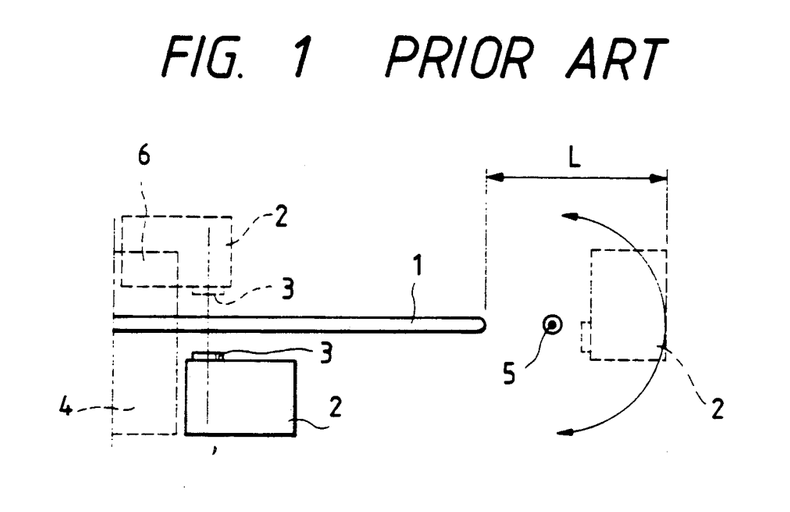
FIG. 1 is a front elevational view of a first conventional disk drive.

Referring to FIG. 1, a conventional disk drive of a first type includes a pickup 2 having an objective lens 3. A disk 1, which stores data on both sides, is rotatably driven and supported by a drive and support mechanism 4 including a spindle, a spindle motor, a turntable, and a clamper. A portion 6 of the mechanism 4 is located above the disk 1. The spindle is disposed near the center of the disk 1. That is, for ease of illustration, only approximately one-half of the disk 1 is shown in FIG. 1.

When the lower side of the disk 1 is played back, the pickup 2 is first brought close to the innermost track on the disk. At this time, the objective lens 3 is located at a portion of the pickup which is radially inward with respect to the disk in order to prevent the lens from bearing against the drive and support mechanism 4. That is, the lens 3 is located at a radially inner half of the pickup.

The pickup 2 is driven radially (from left to right as viewed in FIG. 1) with respect to the disk 1 by a carriage motor (not shown) to play back the disk from the innermost track to the outermost track. That is, the pickup 2 is mounted on a carriage (not shown) which is propelled by the carriage motor.

After the pickup 2 is moved outside the circumference of the disk 1, it is reversed about an axis 5 perpendicular to the direction in which the pickup 2 is moved by the carriage motor, so that the pickup is now above the disk 1. The pickup 2 is then moved into a given position, near the center of the disk, as represented by the dashed lines in FIG. 1. Then, the pickup 2 is moved radially outwardly from that position to play back the upper side of the disk 1.

In this first conventional disk player, the pickup 2 is reversed in this way about the axis 5 perpendicular to the direction in which the pickup is translated by the carriage motor. Therefore, when the pickup 2 is reversed, the radially outer side (with respect to the disk) of the pickup which was placed on the underside is located on the radially inner side and may collide with the upper portion 6 of the mechanism 4. This possibility of collision is especially great in the case of a disk drive capable of playing back compact disks with relatively small radii. To avoid such a collision, various apparatus have been proposed. For example, it has been proposed to place the lens 3 at the radial center of the pickup 2 to form a symmetrical structure, and/or to specially shape the upper portion 6. As a result of the symmetrical structure, the pickup 2 has a relatively great height dimension. Further, distance L between the outer circumference of the disk 1 and the outer circumference of the arc circumscribed by the pickup 2 when it is reversed must be large to enable reversing of the pickup. In addition, the output cord from the pickup 2 must be relatively long, and it is cumbersome to handle it without tangling or the like as the pickup 2 moves.

Figure 2:
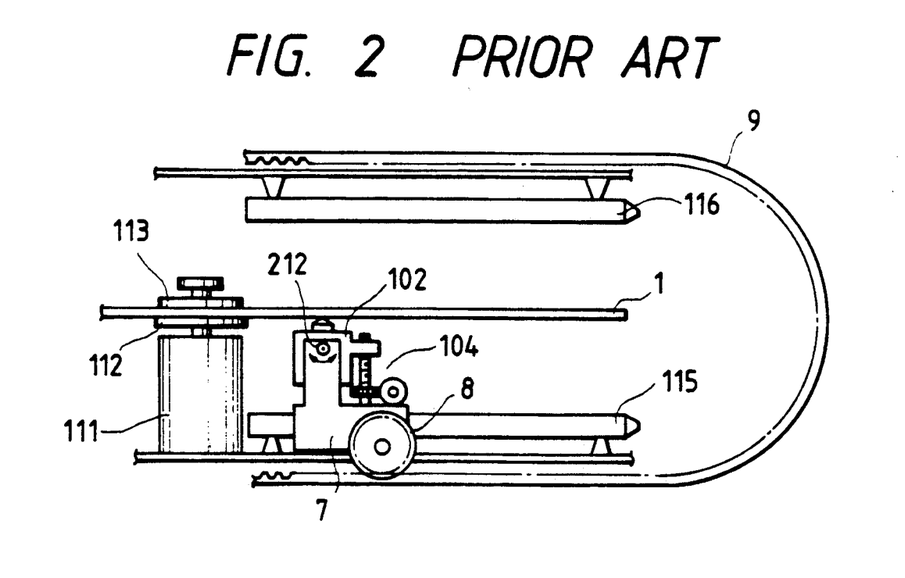
FIG. 2 is a side elevational view of a second conventional disk drive.

FIG. 2 shows the structure of a second conventional disk drive which includes a spindle motor 111 that rotates a turntable 112. A clamper 113 clamps a disk 1 against the turntable 112. A lower guide bar 115 is located below the disk 1 and guides sliding movement of a slider 7 that shifts radially with respect to the disk. An upper guide bar 116 is disposed above the disk. A gear 8 which is mounted to the slider 7 is in mesh with a substantially U-shaped rack 9. When a slider motor (not shown) mounted on the slider 7 is driven, the gear 8 is rotated to cause the slider 7 to slide radially with respect to the disk 1. At this time, the sliding movement of the slider 7 is guided by the guide bar 5. A pickup 102 is installed on the slider 7 and moves radially together with the slider 7. Thus, signals recorded on the disk 1 are played back from the innermost track to the outermost track.

A tilt control mechanism is also mounted on the slider 7. Specifically, the pickup 102 is held on the slider 7 so as to be rotatable about a pin 212. When a driving mechanism 104 is actuated, the pickup 102 is rotated about the pin 212 to control the angle of the pickup with respect to the disk 1.

In this way, the lower side of the disk 1 is played back. When the upper side of the disk 1 is to be played back, the gear 8 is driven so that the slider 7 comes out of the lower guide bar 115. The slider 7 is then reversed while being guided by the rack 9, and fitted over the upper guide bar 116. The pickup 111 will thus face downward, i.e., toward the disk 1. The upper side is then played back and the angle of the pickup is controlled in the same manner as in the case where the lower side is played back.

In this second conventional disk drive, the tilt control mechanism is mounted on the slider 7 in addition to the above-mentioned other elements. Therefore, the total mass of the slider 7 and elements thereon is relatively large. This makes it difficult to rapidly drive the slider 7. In addition, an expensive, large-capacity slider motor is needed, and the whole apparatus thus becomes large. Another disadvantage of this disk drive is that the distance between the disk 1 and the pickup 2 varies if the disk is warped, since only the angle of the pickup 102 is adjusted.

Accordingly, the present invention is also intended to reduce the mass of the slider and its contents. Also, the angle of the slider to the disk is controlled. Further, the distance between the disk and the pickup is maintained constant.

Additionally, motor noise adversely affects the output signal from the pickup, because the slider motor is carried on the slider. Further, the feeder line to the slider motor moves with the slider and so it is cumbersome to handle the line.

A compact disk has only one recorded surface; no signals are recorded on the other surface. Since the pickup is usually disposed on one side (e.g. the lower side) of the turntable, a compact disk is loaded that the recorded surface sits on the turntable. If the disk is incorrectly loaded, i.e., the non-recorded surface is placed on the turntable, then the incorrect loading is detected, and the disk must be removed and reloaded. In the conventional disk player, playback is allowed only if a disk is loaded in such a way that the recorded surface faces downward. Therefore, the user must check the sides of the disk before it is loaded. If the user incorrectly inserts the disk for whatever the reason, the user will be required to remove the disk, flip it, and reload it. In view of the foregoing, the present invention has been made. The present invention is intended to play back the recording on a disk irrespective of how the disk is loaded.

SUMMARY OF THE INVENTION

It is an object of the invention to overcome the above-mentioned deficiencies with previously proposed disk drives. More specifically, it is an object of the invention to provide a disk drive which is simple in structure and has easily manageable wiring.

A first disk drive according to the invention moves a pickup from one side of the disk to the other side to play back both sides of the disk. This first disk drive includes: a first guide mechanism for guiding the pickup along one side of the disk; a second guide mechanism for guiding the pickup along the other side of the disk; and a reversing mechanism for moving the pickup from the first guide mechanism to the second guide mechanism or vice versa. The reversing mechanism reverses the pickup about an axis parallel to the direction in which the pickup is guided by the guide mechanisms, which axis is substantially coaxial with or parallel to a radius of the disk.

The pickup is moved radially with respect to the disk while guided by the first guide mechanism, in order to play back one side of the disk. The pickup is reversed by the reversing mechanism, and then guided by the second guide mechanism. Thus, the other side of the disk is played back.

Since the positions of the inner side and the outer side of the pickup with respect to the radial direction of the disk 1 are not interchanged when the pickup is reversed, the structure of the pickup and drive is simple, and wiring is easily manageable.

Another object of the invention is to reduce the mass of a slider and that which it must carry. It is also an object of the invention to control the angle of the slider and hence the pickup with respect to the disk, as well as the distance between the disk and the pickup.

Accordingly, a second disk drive according to the invention includes: a spindle motor; a turntable rotated by the motor; two pickups disposed on both sides of a disk placed on the turntable or one pickup movable to either side of the disk; a first guide for guiding the pickup disposed on one side of the disk radially with respect to the disk; a first base which holds the first guide and can rotate perpendicularly to the disk; a second guide for guiding the pickup disposed on the other side of the disk radially with respect to the disk; a second base which holds the second guide and can rotate perpendicularly to the disk; and a link which, when the first base rotates, connects the second base to the first base to rotate the second base too.

In operation, when the spindle motor is driven, the disk placed on the turntable is rotated. The pickup or pickups are disposed on the side of the disk which is played back. Where only one pickup is provided, it is shifted to the side of the surface to be played. Where there are two pickups, the pickup disposed on the side of the surface to be played is selected.

When one side is being played back, the pickup is moved radially while guided by the first guide. The first base, hence the first guide, is able to rotate perpendicularly to the disk.

To guide the pickup for playing back the other side, the second guide and the second base which are similar to the first guide and the first base, respectively, are provided.

The first and second bases are coupled together by the link. Therefore, when one of the first and second bases is rotated, the other is also rotated via the link. In this way, the tilt control mechanism is installed off of the slider. Accordingly, the mass of the objects to be slid can be reduced. In addition, the distance between the pickup and the disk can be adjusted by rotating the bases.

It is a further object of the invention to not only reduce the total mass carried by the slider, to increase the speed with which the slider can be moved without increasing the size of a motor for driving the slider, but also to reduce the size of the slider motor and thus reduce the size of the apparatus. It is an additional object to provide a tape drive in which a feeder line to the slider motor need not move with the slider and can be easily managed.

A third disk drive according to the invention includes: a slider carrying a pickup; a rack having teeth at least on first, second and third surfaces; a first feed screw disposed on one side of a disk and in mesh with the teeth on the first surface of the rack; a second feed screw disposed on the other side of the disk and in mesh with the teeth on the second surface of the rack; and a third feed screw disposed at right angles to both the first feed screw and the second feed screw and in mesh with the teeth on the third surface of the rack.

When the first feed screw is rotated, the rack is moved toward the third feed screw on the underside of the disk, because the screw is in mesh with the teeth on the first lower surface of the rack. When the teeth on the third (lateral) surface of the rack are engaged, if the third feed screw is rotated, then the rack is moved toward the second feed screw. When the teeth on the second upper surface of the rack are engaged, if the second feed screw is turned, the rack is moved radially with respect to the disk.

The rack is mounted to the slider that carries the pickup. Therefore, both sides of the disk are played back with the single pickup. Consequently, a small-capacity slider motor can be used. Also, the disk drive can be reduced in size.

Yet another object of the invention is to provide a compact disk player which can play a compact disk having only one recorded surface whether or not the disk is inserted with the recorded surface facing in a predetermined direction. It is also an object of the invention to provide a disk player and a method of playing back a disk which can play back both sides of a compact disk or a video disk.

A display playback method according to the invention includes the steps of: placing a disk having first and second surfaces on a turntable, the first surface having signals recorded on it, the second surface having no signals recorded on it; detecting the first surface; either moving a pickup to the side of the first surface or selecting the pickup on the side of the first surface to play back the first surface, irrespective of how the disk is placed.

When a disk is placed on a turntable, the orientation of the first surface is detected. Where a single pickup is used, the pickup is moved to the side of the first surface. Where two pickups are disposed respectively above and below the turntable, the pickup disposed on the side of the first surface is selected. The moved or selected pickup is used to play back the disk. Therefore, the first surface can be played back, irrespective of how the disk is loaded.

BRIEF DESCRIPTION OF THE DRAWINGS

The above and further objects, features and advantages of the invention will be more apparent upon reading the detailed description set forth below, in conjunction with the drawings, in which.

DETAILED DESCRIPTION OF THE PREFERRED EMBODIMENTS

There are four disk players/drives according to the invention described in detail below.

Figure 3:
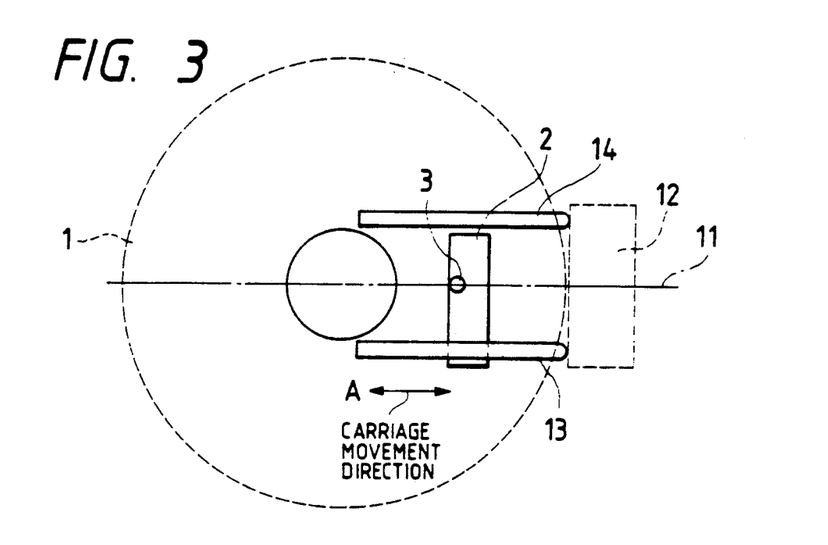
FIG. 3 is a plan view of a first disk drive according to the invention.
Figure 4:
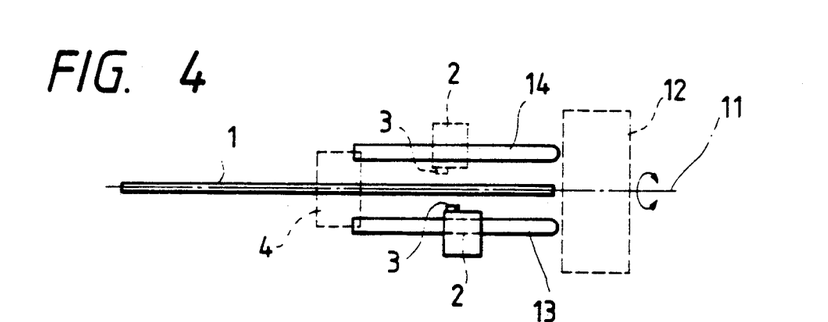
FIG. 4 is a front elevational view of the disk drive shown in FIG. 3.
Figure 5:
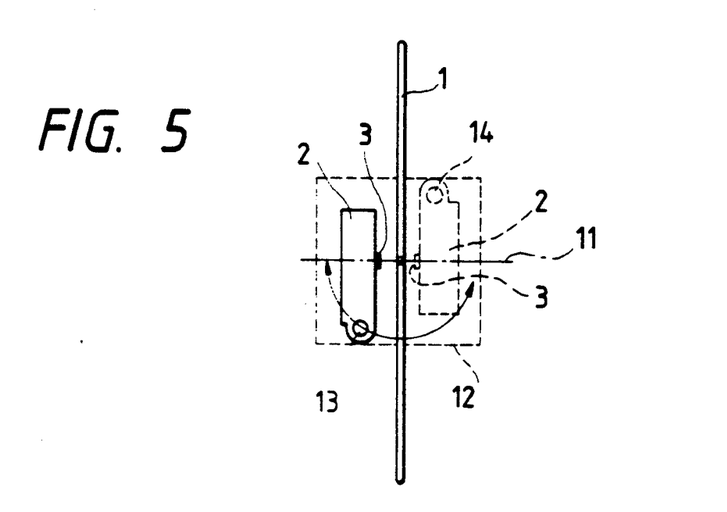
FIG. 5 is a side elevational view of the disk drive shown in FIG. 3.

FIGS. 3-5 show the configuration of a first disk drive according to the invention. It should be noted that like components are indicated by like reference numerals in FIGS. 3-5 and FIG. 1.

A pickup 2 is reversed by a reversing mechanism 12 about an axis 11 which is coaxial with one of the disk's radii. A lower guide mechanism 13 is disposed below disk 1. An upper guide mechanism 14 is disposed above the disk. The upper and lower guide mechanisms 13 and 14 are parallel with the axis 11, which is in a plane at or near the center of thickness of the disk 1.

When the lower side of the disk 1 is played back in the same manner as described in connection with FIG. 1, the pickup 2 is located under the disk 1 as indicated by the solid line in FIG. 4. The objective lens 3 is disposed radially inwardly (with respect to the disk 1) to enable play back of the innermost tracks on the disk.

Under this condition, when a carriage motor (not shown) is energized, the pickup 2 is moved radially outwardly with respect to the disk 1 while the pickup is guided by the guide mechanism 13 to play back the lower side of the disk. The direction of carriage movement A is shown in FIG. 3.

Figure 8:
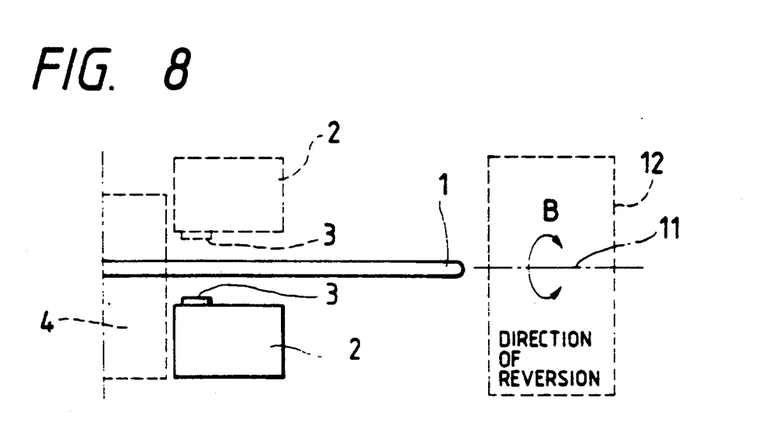
FIG. 8 is a diagram showing the axis about which a pickup is reversed in accordance with the first inventive disk drive.

When the pickup 2 is reversed, it is moved past the outer periphery of the disk and disengaged from the lower guide mechanism 13. When the pickup 2 moves into position for reversal, (i.e., in the lower half of the reversing mechanism 12 in FIG. 4), the reversing mechanism 12 reverses the pickup 2 about the axis 11. The direction of reversal B is best shown in FIG. 8. It is noted that if the pickup 2 is held by a leaf spring (not shown) or other means, the axis 11 can be located above the center of thickness of the disk 1 to compensate for the effect of gravity. That is, the pickup 2 is reversed within a plane perpendicular to the radial direction in which the pickup is moved. Therefore, as shown in FIG. 4, the positions of the radially inner and the outer sides of the pickup 2 are the same when the pickup is above the disk as when it is below the disk.

The now reversed pickup 2 is moved radially inwardly by the carriage motor while guided by the upper guide mechanism 14. Since the positional relationship between the inner side and the outer side of the pickup remains the same, the lens 3 of the pickup 2 can be placed in a given initial position corresponding to the innermost track in the same way as when the lower side of the disk is played back. After the pickup 2 is moved into the given initial position, it is moved radially outward, while guided by the guide mechanism 14, to play back the upper side of the disk 1.

Figure 6:
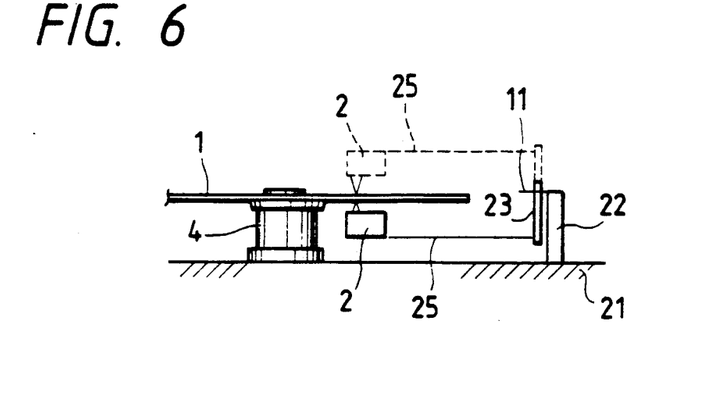
FIG. 6 is a front elevational view of the disk drive shown in FIGS. 3-5 to show the manner in which wiring is treated.
Figure 7:
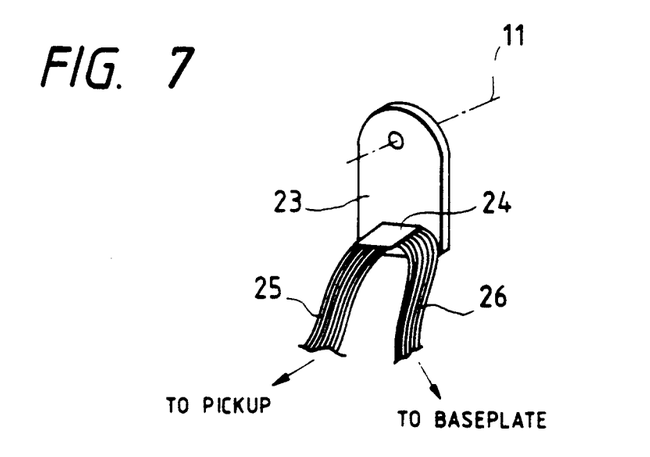
FIG. 7 is a perspective view of a rotary plate shown in the disk drive of FIG. 6.

FIGS. 6 and 7 show a configuration for laying out wiring of the pickup to enable a smooth reversal and minimize the length of the wires. A plate 22 is fixed in a vertical orientation to a baseplate 21 which supports drive and support mechanism 4. A rotary plate 23 is mounted to the plate 22 so as to be rotatable about the axis 11.

A relay baseplate 24 is affixed to the rotary plate 23. A first cord or wires 26, or a flexible printed circuit board, is connected between the baseplate 21 and the relay baseplate 24. A second cord or wires 25, or a flexible printed circuit board, is connected between the pickup 2 and the relay baseplate 24. The first and second cords 25 and 26 are connected together via the relay baseplate 24.

The first and second cords 25 and 26 extend parallel to the disk 1. The first cord 25 extends in the direction of movement of the pickup 2. The second cord 26 runs perpendicular to the direction of movement of the pickup. Therefore, when the pickup 2 is moving, the first cord 25 stretches or contracts while the second cord 26 receives substantially no external force. During reversal of the pickup 2, the second cord 26 stretches or contracts, while substantially no external force is applied to the first cord 25. As a result, none of the cords 25 and 26 are twisted. Hence, they are unlikely to tangle, kink or break. Further, they can be easily handled, because they only stretch and contract.

Using the rotary plate 23 also has the advantage that part of the reversing mechanism 12 can be incorporated in the plate.

As described thus far, in accordance with this first inventive drive, the pickup is reversed about the axis parallel to the direction of movement of the pickup and so the positions of the inner side and the outer side of the pickup are not interchanged. Accordingly, the volume of the portion of the pickup which would otherwise bear against the disk-rotating mechanism can be significantly reduced or eliminated. Consequently, the configuration of the disk player is simplified and reduced in size.

Figure 9:
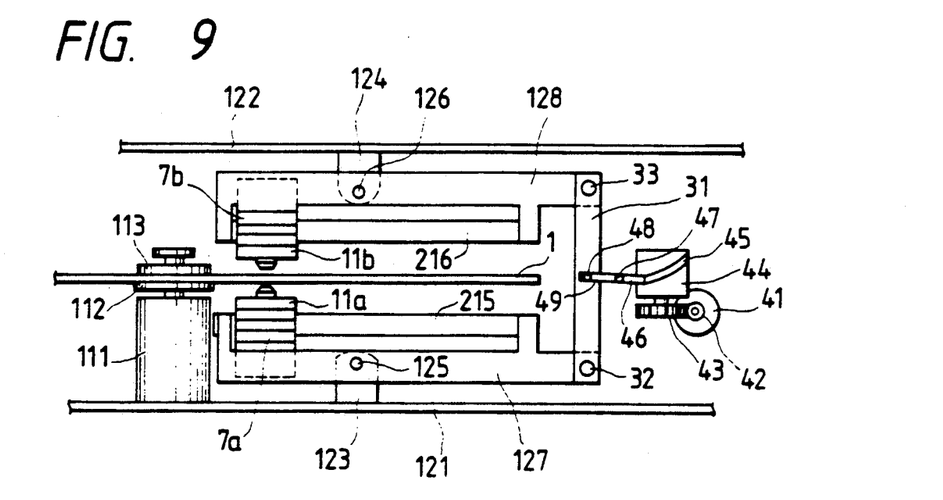
FIG. 9 is a side elevational view of a second disk drive according to the invention.

FIG. 9 shows the structure of a disk drive according to the invention. Like components are denoted by like reference numerals in FIGS. 2 and 9.

Referring to FIG. 9, a spindle motor 111 and a lower plate 123 are fixed to a lower baseplate 121. An upper baseplate 122 is disposed above disk 1, and an upper plate 124 is fixed to the upper baseplate 122. A lower tilt base 127 holds a lower guide bar 215, and is rotatably held to the lower plate 123 by a pin 125. The position of the pin 125 projected on a radial line of the disk does not lie at the end of the innermost track but is located at a position that is at a given distance outwardly from that end. This distance is appropriately selected, depending on the average value of the warp of the disk 1. A lower slider 7a carrying a lower pickup 11a is fitted over the lower bar 215.

An upper slider 7b carrying an upper pickup 11b is disposed above the disk 1. The sliders 7a and 7b are symmetrical with respect to the disk. The upper slider 7b is guided by an upper bar 216 that is held by an upper tilt base 128. The upper tilt base 128 is rotatably held to the upper plate 124 by a pin 126.

The tilt bases 127 and 128 are connected together at their side ends via pins 32, 33 by a link 31.

A worm 41 is rigidly fixed to the rotating shaft of a tilt motor 41. A gear 43 is in mesh with the worm 42. A cam 44 having a cam groove 45 is connected with the gear 43. One end of a lever 46 is fitted in the groove 45. A pin 48 extends upright from the other end of the lever 46. The link 31 is centrally provided with a groove 49 in which the pin 48 is fitted. The lever 46 is capable of rotating about the pin 47.

When the lower side of the disk 1 is to be played back, the pickup 11a is selected. When the upper side is to be played back, the pickup 11b is selected. The slider corresponding to the selected pickup is driven by a motor (not shown). The slider moves radially with respect to the disk while guided by the guide bar 215 or 216. It should be noted that one slider motor can be controlled so that it can selectively drive the sliders, or a separate motor can be provided for each slider.

Whether the upper or lower pickup is selected, the tilt is controlled by the same mechanism. In particular, when the tilt motor 41 is energized and driven, the worm 42 and the gear 43 are rotated. The cam 44 coupled to the gear 43 is then rotated. Thus, the cam groove 45 rotates the lever 46 about the pin 47. The pin 49 mounted to the lever 46 moves the link 31 up and down and so the tilt bases 127 and 128 are rotated about the pins 125 and 126, respectively. Since the guide bars 215, 216 are supported by the tilt bases 127, 128, respectively, the angles of the pickups 11a and 11b relative to the disk 1 are controlled. Also, the space between the pickups and the disk is controlled.

It is to be understood that the present invention is also applicable to the disk drive shown in FIG. 2, where a single pickup moves along the playing surface and has its tilt position controlled, and is reversible for playing both sides of the disk.

As described thus far, in accordance with the second inventive drive, the upper and lower guides respectively disposed above and below the disk are coupled together by the link. The guides are rotated simultaneously to control the tilt. Therefore, the distances of the pickup(s) from the surface of the disk can be adjusted, as well as the angle of the pickup(s) to the disk. Also, the mass of each moving slider can be decreased. This allows rapid movement of the slider. In addition, the size of the disk drive can be reduced.

Figure 10:
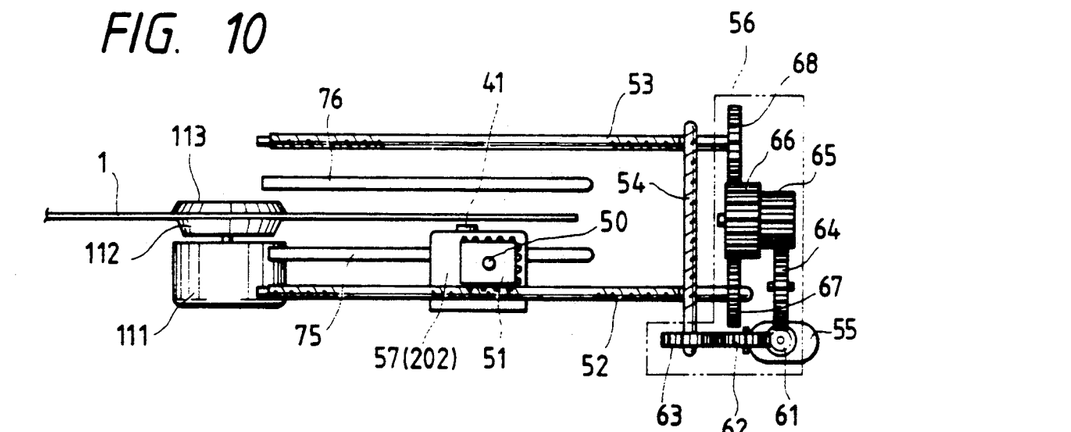
FIGS. 10 and 11 are side elevational views of a third disk drive according to the invention.
Figure 11:
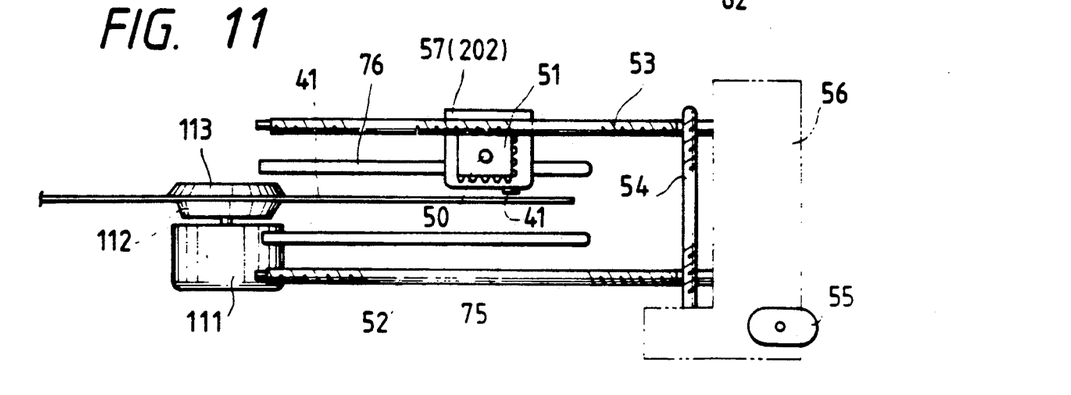

FIGS. 10 and 11 show the structure of a third disk drive according to the invention. It is to be noted that like components are denoted by like reference numerals in both FIGS. 2 and 10-11.

Referring to FIG. 10, a rack 51 has teeth on its upper surface, lower surface, and right side surface. The rack 51 is rotatably mounted to a slider 57 by a pin 50. A lower feed screw 52 is disposed below disk 1. An upper feed screw 53 is located above the disk 1. A side feed screw 54 is disposed perpendicular to the lower and upper feed screws 52 and 53. Rotation of a slider motor 55 is transmitted to the feed screws 52, 53, and 54 via a speed-reducing mechanism 56 which comprises a worm 61 and gears 62-68. Of course, the mechanism can use belts or the like.

When the slider motor 55 is actuated, the rotation is transmitted via the worm 61 and the gears 64, 65, and 66 to the gears 67 and 68. The feed screws 52 and 53 are coupled to the gears 67 and 68, respectively. The teeth on the lower surface of the rack 51 are in the mesh with the lower feed screw 52. As the gear 67 revolves, the feed screw 52 rotates to move the rack 51, hence the slider 7, radially with respect to the disk 1. At this time, the slider 7 moves while guided by the lower guide bar 75. Since the pickup 202 is installed on the slider 7 such that the objective lens 41 faces upward, i.e., toward the disk 1, the lower side of the disk 1 is played back.

When the upper side of the disk 1 is played back, the rack 51 is moved toward the right end of the lower feed screw 52. When the rack 51 is moved into position, the teeth on its right surface comes into mesh with the side feed screw 54. When the gear 63 is rotated via the worm 61 and the gear 62, the side feed screw 54 coupled to the gear 63 is rotated. This moves the rack 51 upward as viewed in the FIG. 10.

When the rack 51 reaches a given vertical position, the teeth on the upper surface of the rack come into mesh with the upper feed screw 53. As the gear 68 turns, the upper feed screw 53 rotates in a given direction, shifting the rack 51 to the left. When the rack 51 is being moved by the side feed screw 54, or immediately after it comes into mesh with the upper feed screw 53, the slider 7 or the pickup 202 is reversed about the pin 50 by a reversing mechanism (not shown) such as that previously described in connection with FIG. 1, and the rack is locked against rotation due to its engagement with the upper and/or side feed screw(s). Thus, as shown in FIG. 11, the lens 41 is caused to face downward, i.e., toward the disk 1. The slider 7, or the pickup 202, is moved radially by rotating the upper feed screw 53 in a given direction. At this time, the slider 7 is guided by the upper guide bar 76. In this way, the upper side of the disk 1 is played back.

The directions in which the feed screws 52, 53 and 54 rotate can be selected by changing the direction of rotation of the slider motor 55. When the lower feed screw 52 rotates in the direction to shift the rack 51 to the right, the rack can be shifted smoothly by rotating the side feed screw 54 in the direction to elevate the rack 51 and rotating the upper feed screw 53 in the direction to shift the rack 51 to the left. Of course, a clutch or other similar mechanism can be included in the speed-reducing mechanism 56, so that only a desired one or a desired two of the three feed screws 52, 53 and 54 is driven at one time.

With the drive according to the present invention, the rack carried on the slider is driven by the feed screws, so the mass of the movable portion of the slider can be reduced. Moreover, wiring can be handled easily, because the slider motor is not installed on the slider. Further, vibration of the wiring is prevented from adversely affecting the pickup.

Figure 12:
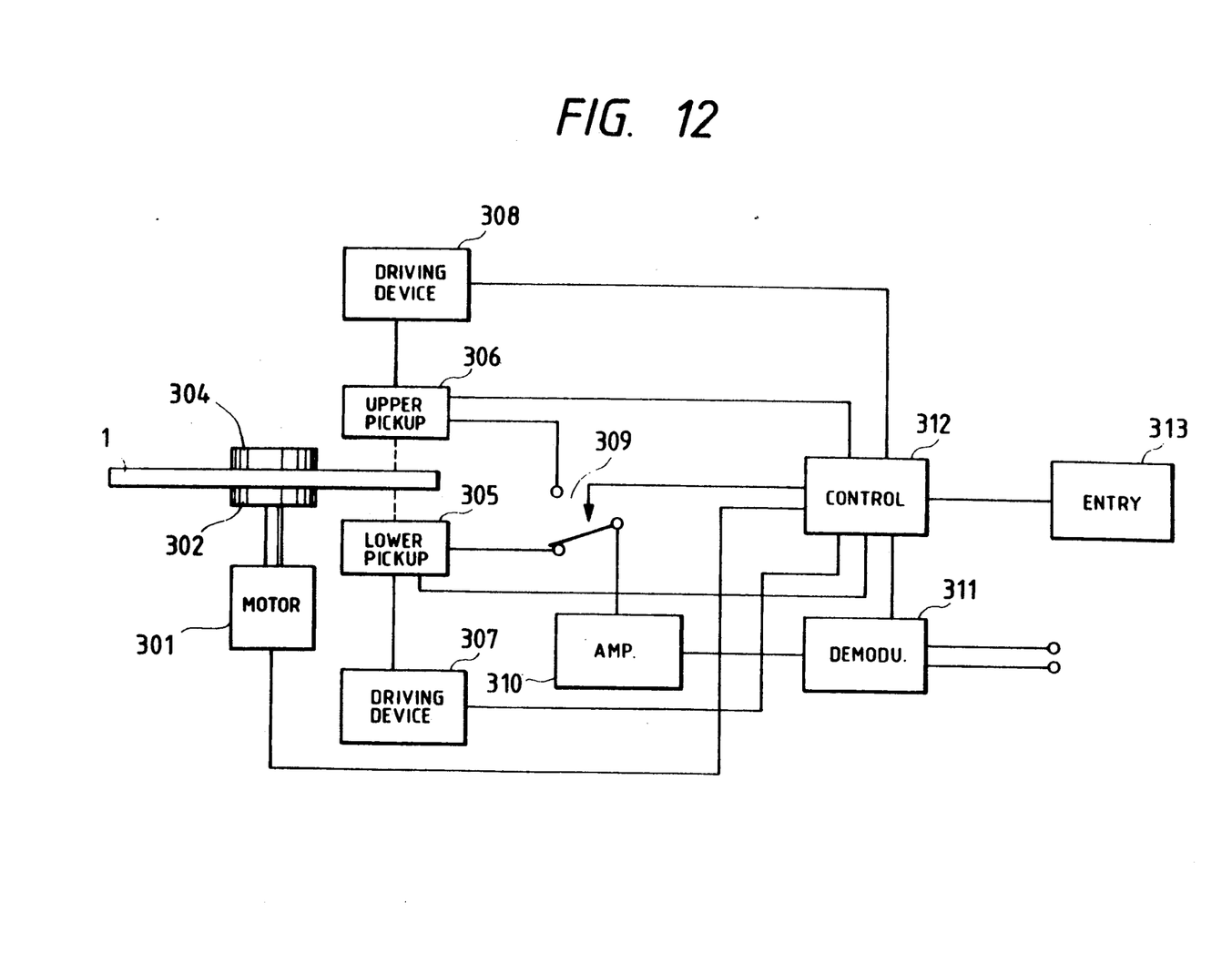
FIG. 12 is a block diagram of a fourth disk player according to the invention.

FIG. 12 is a block diagram of a fourth disk player according to the invention. This player is capable of playing back both a compact disk and an optical video disk. A spindle motor 301 rotates a turntable 302 on which a disk 1 is placed. A clamper 304 clamps the disk 1 against the turntable 302.

Figure 13:
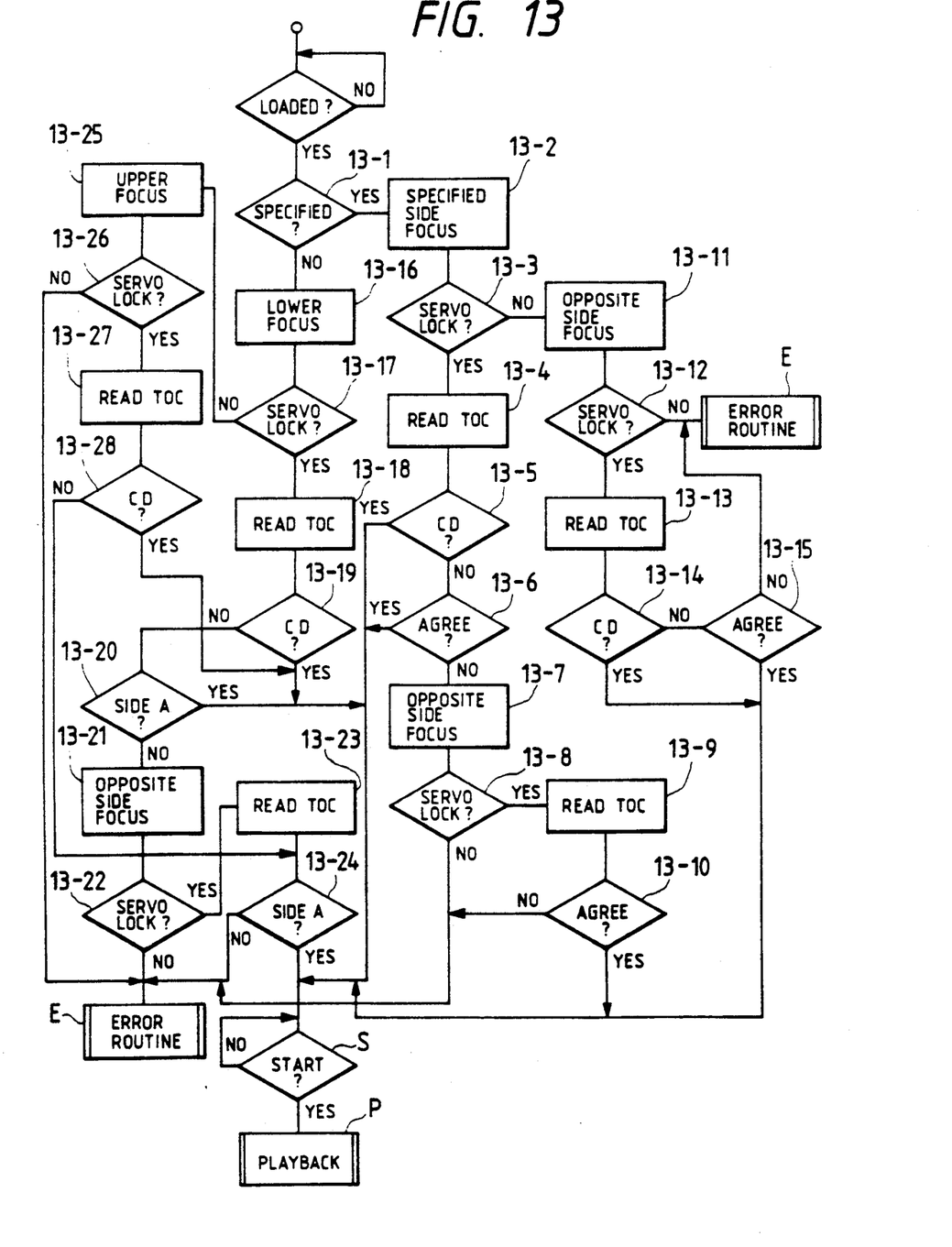
FIG. 13 is a flow chart illustrating the operation of the player shown in FIG. 12.

When the disk 1 is placed on the turntable 302, a control circuit 312 consisting of a microcomputer or the like selects and operates a pickup in accordance with the flow chart of FIG. 13, for example.

An entry mechanism 313 is operated to specify the surface to be played (13-1). The control circuit 312 turns on the focus servo loop of the pickup located on the specified surface (13-2). If the specified surface is side A, a lower pickup 305 disposed below the disk 1, i.e., on the side of the turntable 302, is selected. If side B is specified, then an upper pickup 306 disposed above the disk is selected, and the focus servo loop is activated. When there is only one pickup, the pickup is shifted to the side of the specified surface by a driving device 307 or 308, and then the focus servo loop is turned on. It should be noted that the reversing mechanism for shifting a pickup from one side of the disk to the other can be like that described in this application, or any other appropriate reversing mechanism.

When the focus servo loop is pulled into lock, the innermost control track on the disk 1 is played back (13-3). The output signal from the selected pickup 305 or 306 is fed via a switch 309 to an amplifier 310. The condition of the switch 309 is controlled by the control circuit 312 so as to correspond to the specified surface. The output signal from the amplifier 310 is applied to a demodulator 311. The control circuit 312 reads TOC information from the demodulated signal (13-4). The TOC information contains a code for identifying the side A or B of a compact disk, or a video disk.

Where a compact disk is loaded, there is only one recorded surface (13-5). If a signal indicating the start of playback is entered, that surface is played back (S, P).

Where the loaded disk is a video disk (13-6), if the played surface agrees with the specified surface, then playback is effected. If they do not agree, the selection of one of the pickups 305, 306 is stopped. The other one of the pickups is selected, and the focus servo loop of the selected pickup is turned on (13-7).

When the servo loop is not pulled into lock (13-8), an error routine is carried out (E). When it is pulled into lock, TOC information is read (13-9). If the played surface coincides with the specified surface (13-10) then a playback routine is carried out. If they do not agree, the error routine is performed (E).

When the focus servo loop for the surface specified first is not pulled into lock, the focus servo loop for the other surface is turned on (13-11). If neither of these loops are pulled into lock (13-12), then the error routine is carried out. If either loop is locked, TOC information is read (13-13). When the disk is a compact disk (13-14), or when it is a video disk and the played surface agrees with the specified surface (13-15) the surface is played back (P). If they do not agree, the error routine if carried out (E).

Where the disk loaded in this way is a compact disk, the recorded surface is played back (13-14), whether it faces upward or downward, and the recorded surface is played back even when the opposite, non-recorded side is specified as a played surface. Where a video disk is loaded, the specified side is played back first at all times, whether the side A or B faces downward.

Where neither surface is specified as the surface to be played back (13-1), the focus servo loop in one pickup, for example the lower pickup 305, is turned on (13-16). When the loop is pulled into lock (13-17), TOC information is read (13-18). If it is a compact disk (13-19) or the side A of a video disk (13-20), then playback is effected (P).

When the surface facing downward is side B of a video disk, the focus servo loop in the other pickup 306 is turned on (13-21). If this loop is also not locked (13-22), the error routine is performed (E). When the servo loop is pulled into lock, TOC information is read (13-23). If the played surface is not side A. the error routine is carried out (E). If it is side A (13-24), it is played back (P).

If the focus servo loop in the lower pickup 305 is not first locked, the loop (13-25) in the upper pickup 306 is pulled into lock (13-26). If this servo loop is not locked, the error routine is carried out (E). If the loop is locked, TOC information is read (13-27). If it is a compact disk (13-26) or side A of a video disk (13-24), it is played back (P). If it is not side A of a video disk (13-24), the error routine is carried out (E).

Thus, when the surface to be played is not specified, the recorded surface of a compact disk is played back, irrespective of how the disk is loaded. In the case of a video disk, playback is started from side A.

The output signal from the pickup 305 or 306 is fed to the demodulator 311 via the switch 309 and the amplifier 310. The demodulator 311 delivers a demodulated audio signal and a demodulated video signal.

In order that the pickup 366 disposed opposite to the turntable 302 be capable of playback, it is necessary that the outside diameter of the clamper 304 be equal to or less than the diameter of the turntable 302.

In the above example, a video disk can be played back from both sides. It is also possible to load two compact disks such that the recorded surfaces face outward. In this case, the two recorded surfaces can be played back.

In the above-described fourth disk drive according to the invention, a pickup can be disposed above and below the loaded disk, or a single pickup which can be switched from one side of a disk to the other can be used. Consequently, a disk having only one recorded surface can be played back, irrespective of how it is loaded.

An example of a reversing mechanism suitable for use in the above embodiments of the invention in which a pick-up is rotated about an axis parallel to a radius of a disk is shown in FIGS. 14–17.

Figure 14:
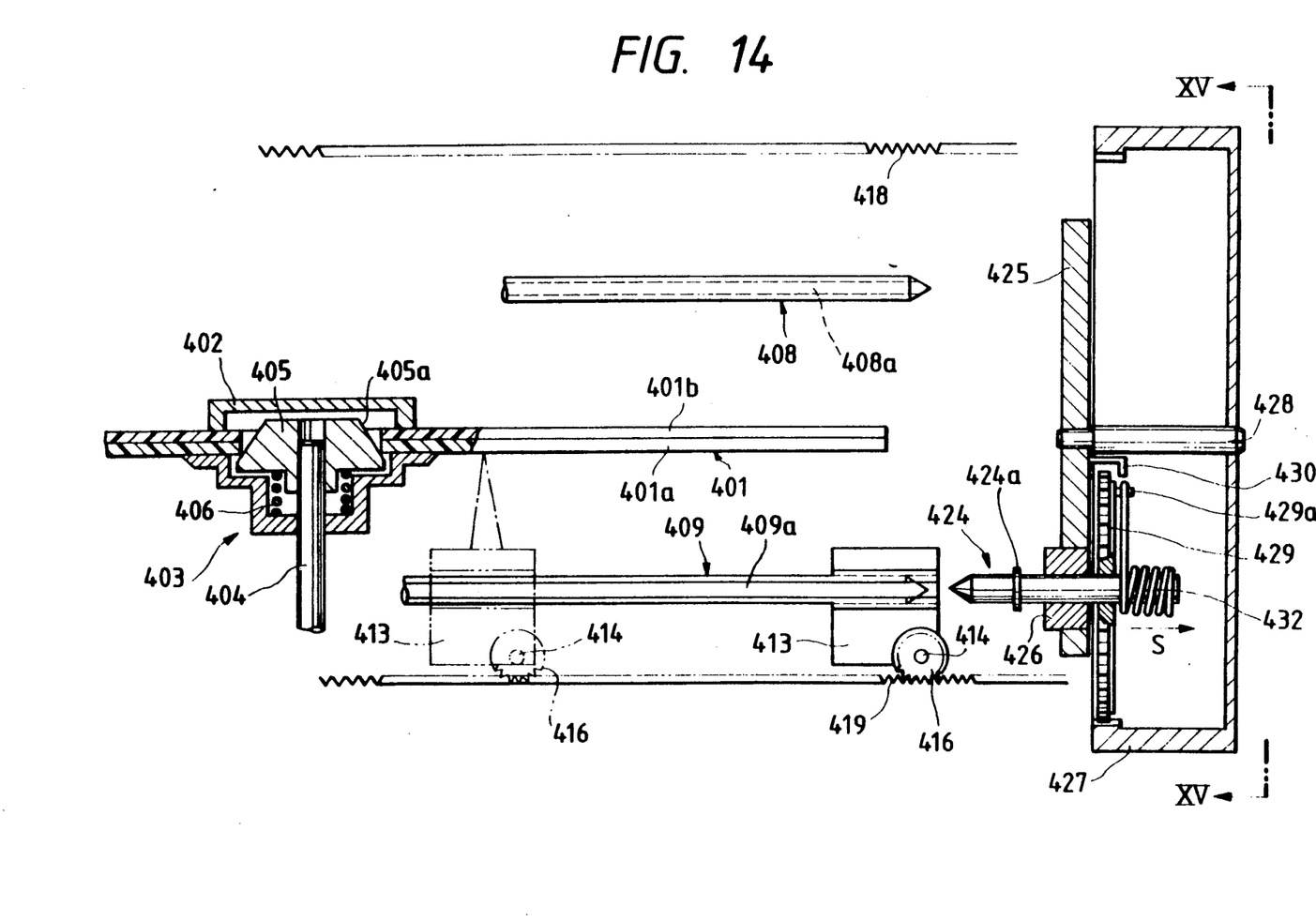
FIG. 14 is an elevated cross-sectional view showing a disk drive with a reversing mechanism suitable for use with the disk drives of previous embodiments of the invention.

Referring to FIG. 14, a disk 401 is held on a turntable 403 by a clamper 402. The turntable 403 is rotated by a spindle 404 to which a centering member 405 is mounted so as to be slidable. A coil spring 406 is disposed between the centering member 405 and the turntable 403 to bias the centering member 405 upward. The centering member 405 has an inclined outer surface 405a. The centering member 405 is fitted in a hole formed in the center of the disk 401 such that the inclined surface 405a bears against the wall defining the hole. Thus, the disk 401 is positioned relative to the spindle 404. The disk 401 consists of two circular baseplates 401a and 401b each having a signal-recording layer. The baseplates 401a and 401b are coupled together in such a way that the signal-recording layers face inward.

Figure 15:
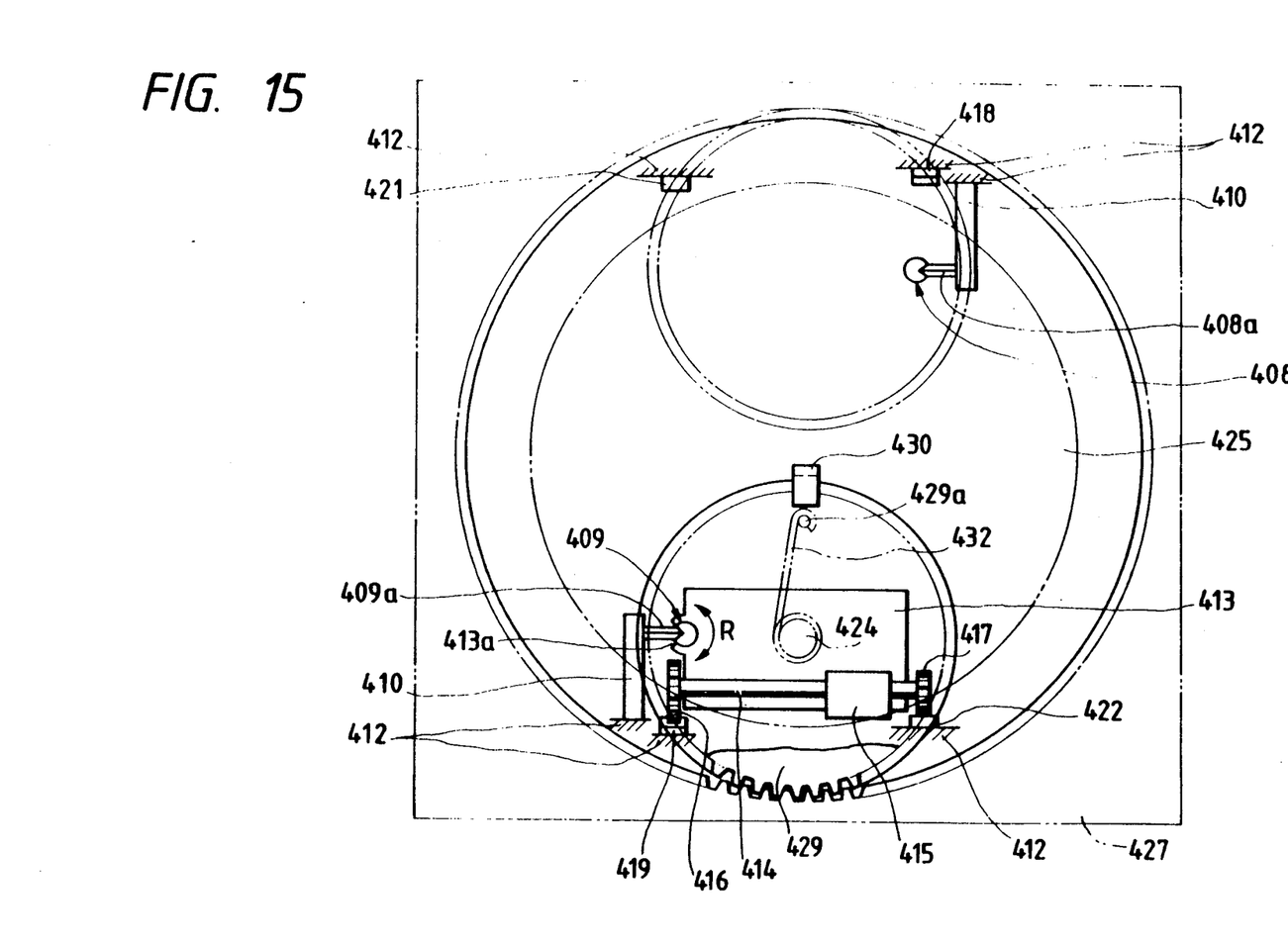
FIG. 15 is a cross-sectional view of the reversing mechanism of FIG. 14 taken along the line XV—XV.

As shown in FIG. 15, a first cylindrical guide member 408 and a second cylindrical guide member 409 are disposed radially of the disk and parallel to the signal-recording surfaces of the disk in such a way that the disk 401 is disposed between the guide members located above and below the disk. The guide members 408 and 409 have protruding portions 408 and 409a at their sides. The guide members 408 and 409 are mounted to a chassis 412 via the protruding portions 408a, 409a and bracket 410. A carriage 413 is removably attached to the guide members 408 and 409. The carriage 413 incorporates an optical pickup means.

A shaft 414 is rotatably mounted to the front end of the carriage 413 and rotated by an electric motor 415. A toothed wheel 416 and a roller 417 are mounted to opposite ends of the shaft 414. A pair of racks 418 and 419 is disposed parallel to the first guide member 408 and the second guide member 409 such that the disk 401 is disposed between the racks. These racks 418 and 419 are rigidly fixed the chassis 412. The toothed wheel 416 rigidly fixed to one end of the shaft 414 can mesh with the racks 418 and 419. Rail members 421 and 422 extend parallel to the racks 418 and 419 and are firmly secured to the chassis 412. The rail members 421 and 422 are so located that the carriage 413 is surrounded by the rail members 421, 422 as well as the racks 418, 419. The roller 417 mounted to the other end of the shaft 414 roll on the rail member 422 or 421. As shown in FIG. 15, the carriage 413 can rotate about the first guide member 408 or the second guide member 409 in any of the directions indicated by the arrows R. The carriage 413 is provided with a notch 413a to prevent the carriage 413 from interfering with the protruding portions 408a and 409a of the guide members 408 and 409 during the rotation.

The outer ends of the first guide member 408 and the second guide member 409 are sharpened. The carriage 413 can be attached to and detached from the sharpened ends of the guide members 408 and 409. When the carriage 413 is separate from the guide members 408 and 409, a retaining pin 424 enters and supports the carriage instead of the guide members. The pin 424 is mounted to a disklike rotary member 425 via a boss 426, and is rotatable relative to the rotary member 425 and axially slidable. The rotary member 425 is rotatably held by a support shaft 408 extending outwardly through a ring gear 427 which is located coaxially with the rotary member. The rotary member 425 is so located as to be rotatable within a plane crossing the direction in which the carriage 413 is guided by the guide member 408 or 409. In this case, the plane is perpendicular to this guiding direction. A planet pinion 429 is in mesh with the ring gear 427. A lock member 430 protrudes from the rotary member 425 and makes sliding contact with the planet pinion 429 to prevent the planet pinion from axially shifting.

A coil spring 432 is mounted on the retaining pin 424 near the rear end of the pin which holds the carriage 413 when the carriage is separate from the first guide member 408 and the second guide member 409. One end of the spring 432 is rigidly fixed to the retaining pin 424, while the other end is connected to a pin 429a protruding from near the outer periphery of the planet pinion 429. The pin 424 has a flange 424a which bears against the carriage 413 to place the carriage in position.

Figure 16:
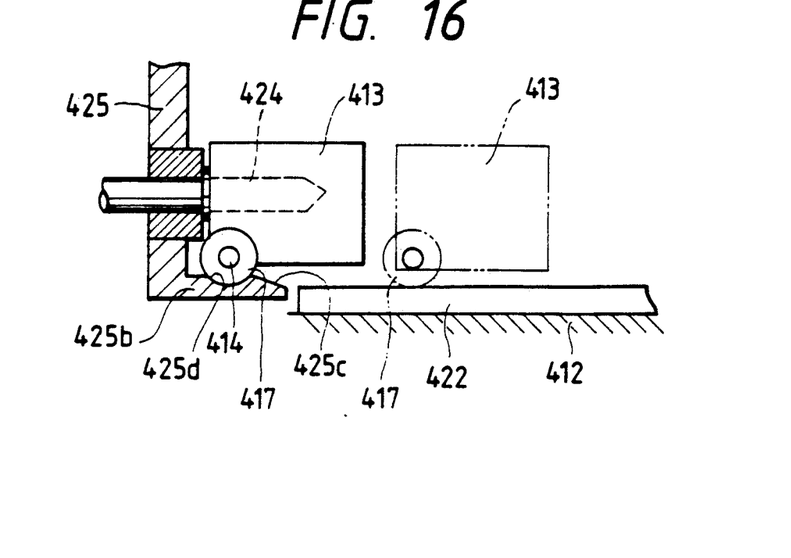
FIG. 16 is a partial cross-sectional view of details of the drive device and reversing mechanism of FIG. 14.

As shown in FIG. 16, the rotary member 425 has a protruding portion 425b extending toward the rail member 422 or 421. After moving away from the rail member 422, the rail member 417 rides over an inclined surface 425c formed around the front end of the protruding portion 425b and then drops into an arc-shaped recess 425d formed behind the inclined surface 425c. Finally, the roller 417 fits in the recess 425d. In this way, the carriage 413 is fixed relative to the retaining pin 424 and the rotary member 425. The carriage 413 is not disengaged from the pin 424 unless a force exceeding a given level is applied. In order that the roller 417 ride on the inclined surface 425c of the protruding portion 425b after leaving the rail member 422 or 421, it is necessary that the carriage 413 rotate about the first guide member 408 or the second guide member 409. This rotation, indicated by the arrows R, is permitted by the provision of the notch 413a formed in the carriage 413 to keep the carriage from interfering with the guide members as mentioned previously. The protruding portion 425b, including the inclined surface 425c and the arc-shaped recess 425d, and the above-described retaining pin 424 constitute a gripping mechanism for holding the carriage 413.

Figure 17:
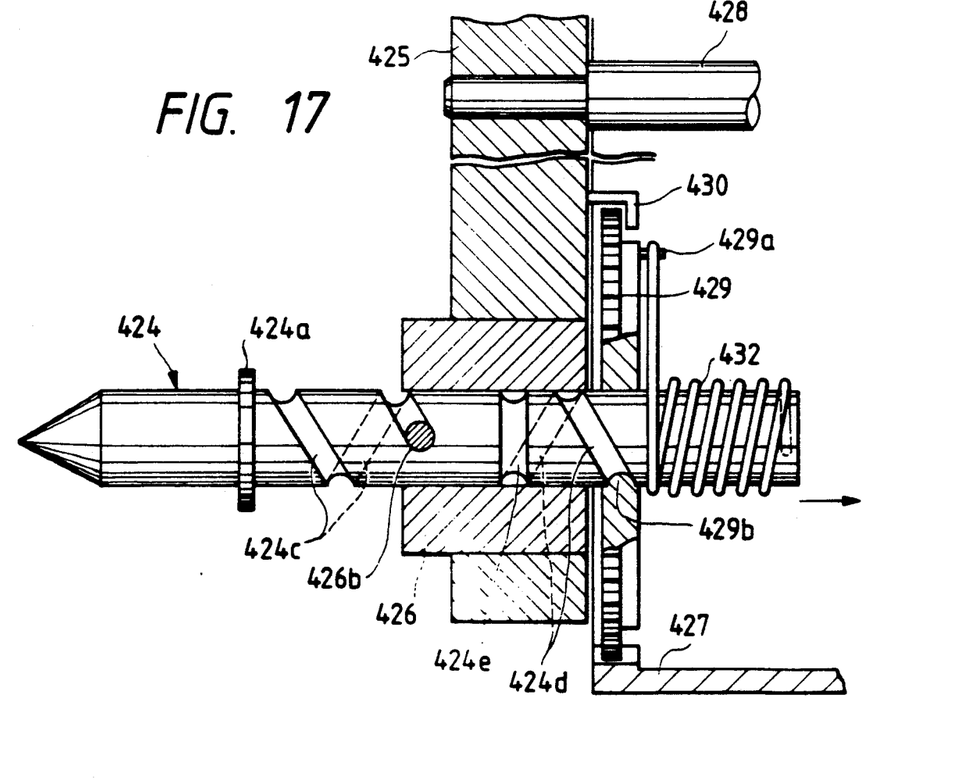
FIG. 17 is an enlarged cross-sectional view showing further details of the drive device and reversing mechanism of FIG. 14.

As shown in FIG. 17, two spiral grooves 424c and 424d having the same pitch are formed in the outer surface of the pin 424 that holds the carriage 413. The grooves 424c and 424d are axially spaced from each other. An annular groove 424e is continuous with the rear spiral groove 424d. Semispherical protrusions 426b and 429b are received in holes which are formed in the centers of the boss 426 and the planet pinion 429, respectively. The pin 424 makes sliding contact with the inner surface of these central holes. One protrusion 426b slides in the spiral groove 424c, whereas the other protrusion 429b slides in the spiral groove 424d and in the annular groove 424c.

The aforementioned ring gear 427 and the planet pinion 429 form a mechanism which transmits torque to the rotary member 425. This torque-transmitting mechanism, the rotary member 425, and the support shaft 428 constitute an inverting mechanism which rotates the gripping mechanism including the retaining pin 424 from the position at which one of the guide members 408 and 409 is attached and detached to the position at which the other is attached and detached, within a plane transverse to the direction in which the carriage is guided by the guide members, thereby turning the gripping mechanism upside down. The shafts 414, the motor 415, the toothed wheel 416, the roller 417 mounted on and in the carriage 413, the racks 418, 419, the rail members 421, 422, the coil spring 432, the spiral grooves 424c, 424d formed in the pin 424 constitute a driving means which drives the inverting mechanism to turn the gripping mechanism upside down.

The operation of the aforementioned disk drive for playing back either side of a disk is next described briefly.

Referring to FIG. 14, when the playback of the lower recording surface of the disk is complete, the carriage 413 is moved further outward and disengaged from the second guide member 409. Then, the carriage 413 is fitted over the retaining pin 424 and bears against the flange 424a. Subsequently, the motor 415 is driven to move the carriage 413 further outward. This causes the pin 424 to slide in the direction indicated by the arrow S. Then, the pin 424 is rotated by the action of one spiral groove 424c formed in the pin 424 and the semispherical protrusion 426b sliding in this groove, the protrusion 426b being formed on the boss 426. However, the planet pinion 429 does not rotate while the retaining pin 424 is turning, since the protrusion 429b protruding into the central hole in the pinion 429 makes sliding contact with the other spiral groove 424d having the same pitch as the spiral groove 424c. Therefore, as the pin 424 rotates, the coil spring 432 deflects, storing energy.

When the retaining pin 424 rotates through a given angle, the protrusion 429b on the planet pinion 429 comes out of the spiral groove 424d and enters the annular groove 424e. Then, the coil spring 432 is released from the deflected state. The restoring force of the spring 432 causes the planet pinion 429 to roll on the ring gear 427 quickly. Since the retaining pin 424 fits in the rotary member 425 together with the planet pinion 429, the rotary member 425 is rotated through 180° in response to the rolling movement of the planet pinion 429. Therefore, the carriage 413 carrying the optical pickup means is turned upside down so as to face the upper recording surface of the disk 401.

The carriage 413 is rotated from the position adapted for the playback of the upper recording surface of the disk to the position adapted for the playback of the lower recording surface in a sequence opposite to the foregoing sequence.

The above-described structure requires only one pickup means, and so cost is reduced.

Also, in the disk drive for playing back both sides of a disk, the gripping mechanism is moved within a plane crossing the direction in which the carriage is guided by either guide member to reduce the size of the drive. If the direction in which the gripping mechanism (holding the carrier and the pickup means) were moved to face either recording surface of the disk and were made coincident with the direction in which the carriage is moved along either guide member during playback of the disk, then the disk drive would be very bulky.

Further, in the disk drive, only the relatively small carriage carrying the pickup means as described above. For this reason, the space needed to invert the pickup means can be made small. Also, the driving means for inverting the lightweight carriage can be small. This also helps miniaturize the whole disk drive.

Additionally, the driving means for inverting the mechanism includes a spring member and a releasing means. The spring member engages with the carriage and deflects by an amount proportional to the amount of movement of the carriage while the carriage is moving toward the gripping mechanism. The releasing means releases the spring member from the deflected state when the carriage is gripped by the gripping mechanism. The restoring force of the spring member drives the inverting mechanism.

That is, as the carriage is moved, energy is stored in the spring member. As soon as the carriage is gripped by the gripping member, the spring member is released from the deflected state. The released energy momentarily rotates the carriage by 180°. Consequently, the played side of the disk can be switched from one recording surface to the other in a shorter time than conventional.

What is claimed is:

1. A disk drive comprising:
    means for supporting an optical disk having first and second principal sides;
    a pickup;
    transporting means for moving said pickup in a radial direction with respect to said disk along the first side thereof, and for moving said pickup in the radial direction with respect to said disk along the second side thereof, said transporting means including first guide means on said first side for guiding said pickup in said radial direction and second guide means on said second side for guiding said pickup in said radial direction; and
    reversing means for transferring said pickup from one of said first and second guide means to the other of said first and second guide means by rotating said pickup about an axis substantially parallel to said radial direction.

2. The disk drive of claim 1, wherein said pickup includes lens means for receiving light reflected from said disk, said lens means being located at a radially inward position of a center point of said pickup with respect to said radial direction when said pickup is on said first side of said disk as when said pickup is on said second side.

3. A disk drive comprising:
    first means for supporting an optical disk having first and second main sides;
    a pickup having lens means for reading information from said disk, said lens means being located at a radially inward position of a center point of said pickup with respect to a radial direction of said disk when said pickup faces said first side of said disk as when said pickup faces said second side;
    transporting means for moving said pickup along said first side in substantially said radial direction, and for moving said pickup along said second side in substantially said radial direction; and
    means for transferring said pickup from one of said first and second sides to the other of said first and second sides,
    wherein said disk drive further comprises:
    a member supported in said disk drive for rotation about said axis;
    a relay connected to said member;
    first means for electrically connecting said pickup to said relay;
    second means for supporting said first supporting means; and
    second means for electrically connecting said relay to said second supporting means.

4. The disk drive of claim 3, wherein said first and second connecting means comprise at least one of wires and a circuit board.

5. The disk drive of claim 3, wherein said transferring means rotates said pickup about an axis substantially parallel to said radial direction.

6. A disk drive comprising:
    means for rotatably supporting a disk;
    a pickup disposed on one side of said disk;
    means for moving said pickup from said one side of said disk to the other side;
    a first guide for guiding said pickup disposed on said one of the disk along said disk;
    first base means for supporting said first guide;
    a second guide for guiding the pickup when it is disposed on the other side of said disk;
    second base means for supporting said second guide; and means for rotating one of said first and second base means in a plane perpendicular to said disk, said means for rotating including linking means for causing the other of said first and second base means to rotate in a plane perpendicular to said disk in response to operation of said means for rotating.

7. The disk drive of claim 6, wherein said linking means comprises a linking rod connected to each of said first and second base means.

8. The disk drive of claim 7, wherein said means for rotating further comprises a lever connected to said linking rod, a tilt motor, and means for moving said lever in response to actuation of said tilt motor to move said linking rod so as to rotate said first and second base means.

9. A disk drive comprising:
means for rotatably supporting a disk having first and second main sides;
first and second pickups disposed on said first and second sides of said disk, respectively;
a first guide for guiding said first pickup along said first side of said disk;
first base means for supporting said first guide;
a second guide for guiding said second pickup along said second side;
second base means for supporting said second guide; and
means for rotating one of said first and second base means in a plane perpendicular to said disk, said means for rotating including linking means for causing the other of said first and second base means to rotate in a plane perpendicular to said disk in response to operation of said means for rotating.

10. The disk drive of claim 9, wherein said linking means comprises a linking rod connected to each of said first and second base means.

11. The disk drive of claim 10, wherein said means for rotating further comprises a lever connected to said linking rod, a tilt motor, and means for moving said lever in response to actuation of said tilt motor to move said linking rod so as to rotate said first and second base means.

12. A disk drive comprising:
means for rotatably supporting a disk having first and second sides;
carrier means for carrying a pickup;
a rack supported on said carrier means;
first feeding means for engaging a first surface of said rack when said carrier means is on said first side of said disk to move said carrier means along said first side;
second feeding means for engaging a second surface of said rack when said carrier means is on said second side of said disk to move said carrier means along said second side; and
third feeding means extending substantially perpendicular to said disk for engaging a third surface of said rack when said carrier means is adjacent said third feeding means.

13. The disk drive of claim 12, wherein said rack has teeth on said first, second and third surfaces, and said first, second and third feeding means comprise feed screws for meshing with the teeth of said first, second and third surfaces, respectively.

14. The disk drive of claim 13, wherein said first and second feed screws are disposed substantially parallel to said disk, and said third feed screw is disposed substantially perpendicular to said first and second feed screws.

15. The disk drive of claim 14, said first and second drive trains are both driven by a common motor.

16. The disk drive of claim 13, wherein said first, second and third feed screws are rotated by first, and third gears, respectively, and said disk drive further comprises means for rotating said first, second and third gears, said means for rotating including a common gear for engaging said first and second gears, a first drive train from rotating said common gear, and a second drive train for rotating said third gear.

17. The disk drive of claim 12, further comprising means for moving said supporting means from one of said first and second sides of said disk to the other of said first and second sides.

18. A disk player for playing back a disk having recorded information on a first side of said disk, said disk player comprising:
means for detecting said first side of said disk based on at least one of the presence and content of the recorded information, said detecting means including pickup means for reading the recorded information from said disk;
means for positioning and/or actuating said pickup means for playing back the information recorded on said first side when said first side is detected;
means for selecting one of said first and second sides of said disk for play back; and
control means for actuating said means for positioning and/or actuating said pickup means for playing back the information recorded on said first side when said first side is selected and detected and when no side is selected and said first side is detected, and for actuating said means for positioning and/or actuating said pickup means for playing back the information recorded on said second side when said second side is selected and said first side is not detected.

19. A disk player for playing back a disk having recorded information on a first side of said disk, said disk player comprising:
means for detecting said first side of said disk based on at least one of the presence and content of the recorded information, said detecting means including pickup means for reading the recorded information from said disk;
means for positioning and/or actuating said pickup means for playing back the information recorded on said first side when said first side is detected;
means for selecting one of said first and second sides of said disk for play back; and
control means for actuating said detecting means to search for recorded information on one of said first and second sides of said disk and for actuating said detecting means to search for recorded information on the other side of said disk when no information is found on the one side.

* * * * *